US011970966B2

(12) United States Patent
Owen et al.

(10) Patent No.: US 11,970,966 B2
(45) Date of Patent: *Apr. 30, 2024

(54) SPLIT CYCLE INTERNAL COMBUSTION ENGINE PROVIDED WITH A WATER INJECTION

(71) Applicant: Dolphin N2 Ltd, Sussex (GB)

(72) Inventors: Nick Owen, Sussex (GB); Rhys Pickett, Sussex (GB); Rob Morgan, Sussex (GB); Andrew Atkins, Sussex (GB)

(73) Assignee: Dolphin N2 Ltd, Sussex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/019,991

(22) PCT Filed: Jul. 28, 2021

(86) PCT No.: PCT/GB2021/051949
§ 371 (c)(1),
(2) Date: Feb. 6, 2023

(87) PCT Pub. No.: WO2022/029409
PCT Pub. Date: Feb. 10, 2022

(65) Prior Publication Data
US 2023/0279804 A1    Sep. 7, 2023

(30) Foreign Application Priority Data

Aug. 7, 2020  (GB) .................................. 2012337

(51) Int. Cl.
*F02B 33/22*    (2006.01)
*F02B 47/02*    (2006.01)
(Continued)

(52) U.S. Cl.
CPC .............. *F02B 33/22* (2013.01); *F02B 47/02* (2013.01); *F02D 41/0025* (2013.01);
(Continued)

(58) Field of Classification Search
CPC ..... F02D 41/00; F02D 41/0025; F02M 25/02; F02M 25/0222; F02M 25/0224;
(Continued)

(56) References Cited

U.S. PATENT DOCUMENTS 3,708,976 A * 1/1973 Berlyn .................... F01B 17/04
                                                              60/39.63
6,952,923 B2 * 10/2005 Branyon ................ F02B 33/44
                                                              123/70 R
(Continued)

FOREIGN PATENT DOCUMENTS

DE    102007042236 A1    3/2009
DE    102018129178 A1    5/2020
(Continued)

OTHER PUBLICATIONS

Combined Search and Examination Report for Application No. GB2012337.8, dated Sep. 10, 2020, 6 pages.
(Continued)

*Primary Examiner* — John Kwon
*Assistant Examiner* — Johnny H Hoang
(74) *Attorney, Agent, or Firm* — Barnes & Thornburg LLP

(57) ABSTRACT

A split cycle internal combustion engine comprises a combustion cylinder and a compression cylinder arranged to receive air and compress the air to provide a compressed working fluid to the combustion cylinder for combustion. The compression cylinder is coupled to a water reservoir. The engine further comprises a controller arranged to receive an indication of at least one parameter associated
(Continued)

Figure 1:
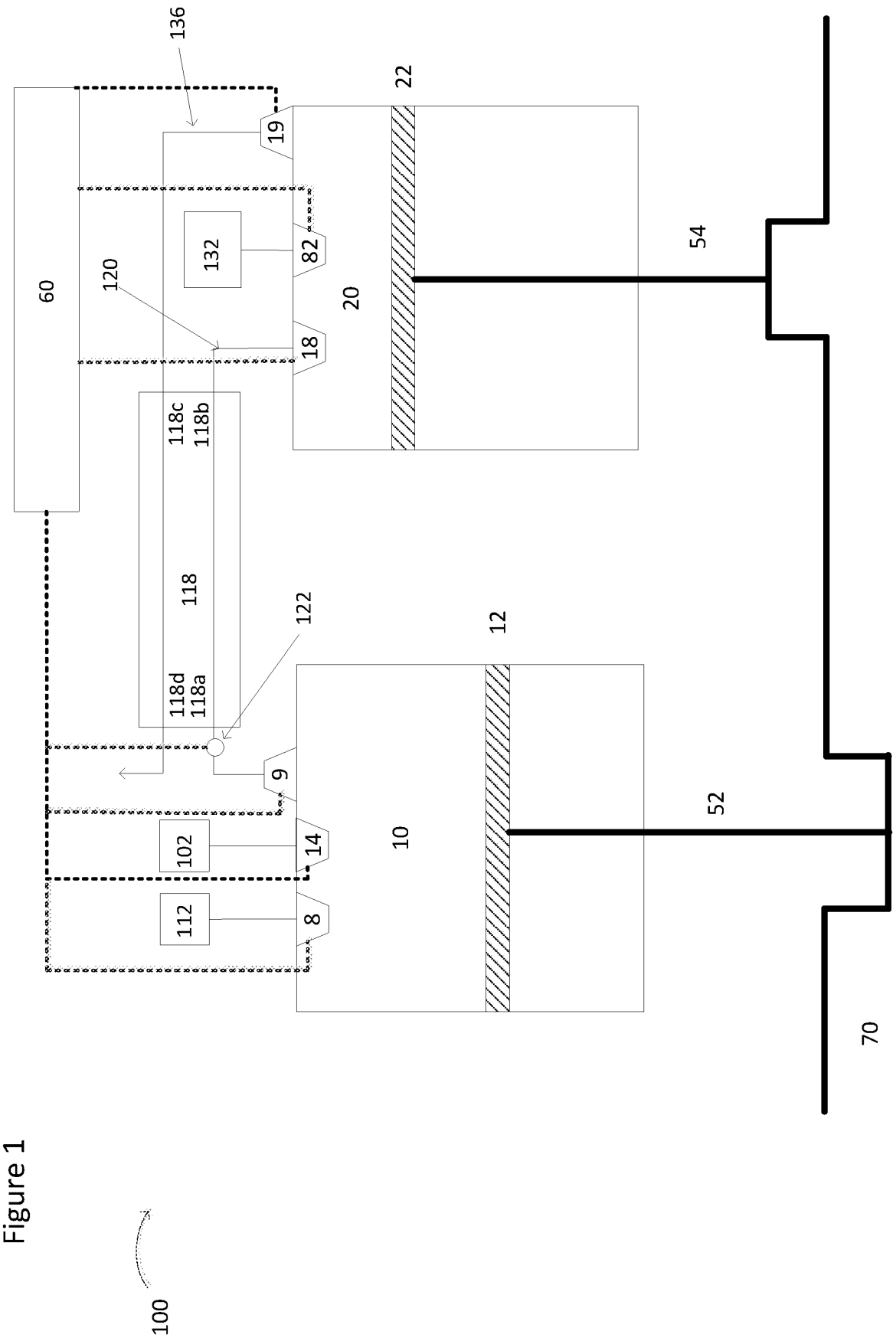

with the engine and/or a fluid associated therewith, and control delivery of the mass of water delivered to the compression cylinder based on the indication of the at least one parameter such that the total mass of water in the compressed working fluid at the end of the compression stroke results in a level of water concentration in the compressed working fluid that is less than a threshold water concentration level.

20 Claims, 6 Drawing Sheets

(51) Int. Cl.
 F02D 41/00 (2006.01)
 F02M 25/022 (2006.01)
 F02M 25/03 (2006.01)
(52) U.S. Cl.
 CPC .... F02M 25/0222 (2013.01); F02M 25/0224 (2013.01); F02M 25/0227 (2013.01); F02M 25/03 (2013.01); F02D 2200/023 (2013.01); F02D 2200/024 (2013.01); F02D 2200/0606 (2013.01); F02D 2200/703 (2013.01)
(58) Field of Classification Search
 CPC .... F02M 25/0227; F02M 25/03; F02B 33/22; F02B 47/02
 See application file for complete search history.

(56) References Cited

U.S. PATENT DOCUMENTS

| | | | |
|---|---|---|---|
| 11,078,829 B2* | 8/2021 | Morgan | F02B 51/00 |
| 11,092,066 B2* | 8/2021 | Atkins | F02B 29/0481 |
| 2008/0202454 A1* | 8/2008 | Pirault | F02B 47/02 |
| | | | 123/58.8 |
| 2009/0205606 A1* | 8/2009 | Kawamata | F02M 25/0228 |
| | | | 701/111 |
| 2012/0103314 A1* | 5/2012 | Jackson | F25J 1/0201 |
| | | | 123/70 R |
| 2019/0055898 A1* | 2/2019 | Roskilly | F01B 11/00 |
| 2019/0368415 A1* | 12/2019 | Morgan | F02B 51/00 |

FOREIGN PATENT DOCUMENTS

| | | |
|---|---|---|
| GB | 2560949 A | 10/2018 |
| GB | 2563928 A | 1/2019 |
| GB | 2565217 A | 2/2019 |
| WO | 2018115863 A1 | 6/2018 |

OTHER PUBLICATIONS

Combined Search and Examination Report for Application No. GB2100320.7, dated Feb. 12, 2021, 5 pages.
International Search Report for Application No. PCT/GB2021/051949, dated Oct. 8, 2021, 20 pages.

* cited by examiner

SPLIT CYCLE INTERNAL COMBUSTION ENGINE PROVIDED WITH A WATER INJECTION

CROSS REFERENCE TO RELATED APPLICATIONS

This application is a national stage entry of International Patent Application No. PCT/GB2021/051949 dated 28 Jul. 2021, which claims priority to and the benefit of GB Patent Application No. 2012337.8 dated 7 Aug. 2020, the disclosures of which are now expressly incorporated herein by reference.

FIELD OF THE INVENTION

The present disclosure relates to a split cycle internal combustion engine and method of operating the same.

BACKGROUND

In a split cycle internal combustion engine, a working fluid comprising air is compressed in a first, compression, cylinder and provided to a second, combustion, cylinder, where fuel is injected and the mixture of the fuel and the high-pressure fluid combusts to produce drive. Thermodynamic benefits may be derived from separating the compression and the expansion/combustion processes in this manner. WO 2010/067080 describes a split cycle engine and associated thermodynamic advantages.

The first stage of a thermal power cycle, such as a gas turbine or internal combustion engine involves the compression of the working fluid. In the case of a gas turbine, to typically 20-25 bar and as high as 100 bar for a Diesel cycle internal combustion engine. The resulting compression work is effectively a parasitic load on the cycle and must be subtracted from the work recovered during the expansion stage of the cycle to calculate the useful net cycle work. The compression process is near adiabatic and results in significant charge heating before the addition of heat via the combustion process.

SUMMARY OF THE INVENTION

Aspects of the invention are as set out in the independent claims and optional features are set out in the dependent claims. Aspects of the invention may be provided in conjunction with each other and features of one aspect may be applied to other aspects.

The present disclosure relates to a split cycle engine whereby a coolant such as water is delivered in a controlled fashion into the compression cylinder during a compression stroke to limit a rise in temperature caused by the compression stroke. The mass (and optionally temperature, duration and timing) of the water delivered into the compression cylinder is controlled such that the water absorbs the rise in temperature via both sensible heat and latent heat, and such that the total mass of water delivered results in a water concentration level less than a threshold concentration level, which may be selected such that the working fluid is still capable of sustaining combustion in the combustion cylinder.

While water is described as being the coolant throughout many of the examples of the disclosure, it will be understood that other fluids may be used instead of water, such as liquefied carbon dioxide (for example, liquefied via a refrigeration process and/or under pressure) or liquid ammonia.

Where water is used it will be understood that the water may be conventional tap water or may be distilled and/or deionised water.

In the present case, the inventors have discovered that the compression work can be significantly reduced, potentially increasing the power output from the cycle for a given mass of working fluid, if heat is removed during compression, and that this heat can be removed by delivering water to the compression cylinder during the compression stroke. Furthermore, the inventors have surprisingly discovered that by controlling the mass of water delivered such that most of the water vaporises into its gaseous phase, and delivering it in a manner such that it is capable of absorbing heat via both sensible heat and latent heat (for example by delivering it at a temperature close to but below the boiling point of water for the pressure it is being delivered at), the compression work can be significantly reduced (more so than just by relying on absorption via e.g. sensible heat) and yet the compressed working fluid can still be capable of sustaining combustion without the coolant (water) having to be removed from the compressed working fluid beforehand.

Accordingly, in a first aspect of the present disclosure there is provided a split cycle internal combustion engine comprising a combustion cylinder accommodating a combustion piston and a compression cylinder accommodating a compression piston and being arranged to receive air and compress the air to provide a compressed working fluid to the combustion cylinder for combustion, the compression cylinder being coupled to a water reservoir. The split cycle internal combustion engine also comprises a controller arranged to receive an indication of at least one parameter associated with the engine and/or a fluid associated therewith, and control delivery of the mass of water delivered from the reservoir to the compression cylinder based on the indication of the at least one parameter such that during a compression stroke the water absorbs, via both sensible heat and latent heat, a rise in temperature caused by the compression stroke such that at least some of, and in some examples a majority of (and in some examples substantially all of), the water vaporises into its gaseous phase during the compression stoke and a rise in temperature caused by the compression stroke is limited by the absorption of heat by the water. The controller is configured to control the delivery of the mass of water such that the total mass of water in the compressed working fluid at the end of the compression stroke results in a level of water concentration in the compressed working fluid that is less than a threshold water concentration level.

It will be understood that the total mass of water in the compressed working fluid at the end of the compression stroke comprises water in both liquid and gaseous forms. However, in other examples, the controller may control the delivery of the mass of water such that the mass of liquid water in the compressed working fluid at the end of the compression stroke is less than a threshold (liquid) water concentration level. The threshold water concentration level may be determined based on the maximum concentration of water in the compressed working fluid that is capable of sustaining combustion in the combustion cylinder.

The indication of at least one parameter may comprises an indication of a temperature associated with the combustion cylinder and/or a fluid associated therewith, for example, the temperature of an exhaust emitted from the combustion cylinder.

The compression cylinder may comprise an outlet port and the combustion cylinder comprises an inlet port coupled to the outlet port of the compression cylinder via a recuperator for receiving a compressed fluid therefrom, wherein the recuperator is arranged to raise the temperature of the compressed fluid delivered to the combustion cylinder, and wherein the indication of the at least one parameter comprises at least one of (i) a temperature, (ii) a pressure, and (iii) an oxygen concentration of the fluid in the recuperator. The recuperator may be operable to raise the temperature of the working and/or more actively control it (e.g. via both raising it and/or lowering it). If the indication of the at least one parameter comprises a temperature, this could be the temperature of the recuperator inlet (i.e. the inlet that receives the compressed working fluid from the compression cylinder). The controller may also configured to control the delivery of water to the recuperator to control the temperature of the compressed working fluid in the recuperator— this may be directly (e.g. via direct delivery into the recuperator) and/or by delivering an excess of water to the compression cylinder such that more is received by the recuperator.

The indication of at least one parameter may additionally or alternatively comprises a desired power output of the engine. This may be determined, for example, based on the depression of a gas pedal and/or on a fuel demand. For example, the controller may control the mass of water to be delivered based on (for example, proportional to) the amount of fuel that will be delivered to the compressed working fluid in the combustion cylinder.

The indication of the at least one parameter may additionally or alternatively comprise an oxygen concentration associated with the engine or a fluid therein.

In some examples the indication of the at least one parameter comprises at least one of (i) the temperature of the water being delivered to the compression cylinder, (ii) the temperature of the air being delivered to the compression cylinder, (iii) the humidity of the air being delivered to the compression cylinder, and (iv) the ambient air pressure. For example, if the ambient air pressure is lower, the air may be drier and so the controller may determine that relatively more water can be absorbed by the working fluid and combustion still be maintained in the downstream combustion cylinder. For example, the controller may be configured to determine the water carrying potential of the air being admitted to the compression cylinder and determine the mass of water to be delivered based on the water carrying potential. In some examples the controller may be configured to actively control the humidity of the air to within a selected range, for example by controlling a heating and/or cooling means to actively heat and/or cool the air. For example, the controller may be configured to dry the air if the humidity is above a selected threshold humidity (the threshold humidity may be based on the ambient air pressure). For example, the air may be cooled to reduce the humidity to or below a selected threshold humidity. An advantage of this is that the cooler air may also be denser, improving the charge of the working fluid.

In some examples the controller is configured to control the delivery of water that the mass of water in the compressed working fluid in the combustion cylinder has a level of water concentration less than a maximum combustion water concentration level, wherein the maximum combustion water concentration level is the maximum concentration of water in the compressed working fluid that is capable of sustaining combustion and above which would prevent combustion from occurring.

The controller may be configured to operate a heating means to control the temperature of the water delivered to the compression cylinder. For example, the controller may be configured to control the temperature of the delivered water such that it is below (and/or within a selected range of) the boiling point of water for the pressure it is being delivered at. The heating means may, for example, comprise a heat exchanger and may be coupled to a radiator/HVAC (heating ventilation and air conditioning) system of the vehicle. In some examples the heating means may comprise two heating means—one to heat a tank or reservoir of water to a first selected temperature, and the other to heat the water up to a second higher temperature for delivery to the compression cylinder.

In some examples the controller is configured to determine the time taken for the delivered water to boil from the moment that it is delivered into the compression cylinder. In such examples the controller may be configured to control the temperature of the delivered water such that the determined time taken for the delivered water to boil is within a selected water boil time range. The controller may determine the time taken for the delivered water to boil, for example, by reference to lookup table (LUT), that may, for example, list known relationships between parameters such as pressure, humidity and temperature.

The controller may be configured to control the pressure of water delivered to the compression cylinder based on at least one of (i) the determined mass of water delivered, and (ii) an indication of a parameter associated with the engine or a fluid therein. It will be understood that the indication of a parameter used for controlling pressure could be the same parameter used for determining the mass of water to be delivered, or the indication of a parameter used for controlling pressure could be a different parameter.

In some examples the controller is configured to control the range of droplet sizes of water delivered to the compression cylinder. The range of droplet sizes may be controlled, for example, to alter the extent to which they are projected through the compression cylinder and thereby to achieve improved mixing of the water with the air throughout the volume of the compression cylinder. The range of droplet sizes may be controlled as a function of the determined mass, the pressure and/or the duration of delivery. For example, the range of droplet sizes may vary inversely as a function of delivery duration, so that for shorter deliveries the droplets are larger on average than for longer delivery durations where the droplets may be smaller on average.

The controller may be configured to control the duration of water delivery to the compression cylinder based on at least one of (i) the determined mass of water delivered, and (ii) an indication of a parameter associated with the engine or a fluid therein. It will be understood that the indication of a parameter used for controlling pressure could be the same parameter used for determining the mass, or the indication of a parameter used for controlling pressure could be a different parameter.

The controller may be configured to control the timing of water delivery relative to the crank angle of the compression piston during the compression cycle based on the indication of the at least one parameter. For example, the controller may be configured to control the timing of water delivery based on the temperature of water being delivered and/or air temperature (e.g. if the water and/or incoming air is cooler the water is injected closer to BDC, if the water and/or incoming air is warmer it is injected closer to TDC). For example, if the engine is just starting up after rest then the heating means (if present) may not be effective at heating the water up to the selected temperature initially, and so the controller may alter the timing of water delivery accordingly.

The compression cylinder may comprise an inlet for drawing in air to the cylinder, and an outlet for exhausting compressed working fluid out of the compression cylinder, and wherein the compression cylinder comprises an injector located between the inlet and the outlet for delivering water into the compression cylinder. The injector may be located on a face of the compression cylinder opposing the working surface of the compression piston. In some example the compression cylinder comprises a pair of injectors.

The combustion cylinder may be coupled to a fuel reservoir, and the controller may be configured to control delivery of the fuel to the combustion cylinder based on the indication of the at least one parameter. The controller may be configured to control delivery of fuel based on the mass of water delivered to the compression cylinder. In some examples the controller is configured to control delivery of fuel and water such that the ratio of delivered fuel to delivered water is within a selected range. In some examples the controller is configured to control delivery of fuel and water such that the ratio of delivered fuel to delivered water is substantially constant.

In some examples the controller is configured to control the mass of water delivered into the compression cylinder based on the indication of the at least one parameter such that:

when the indication of the at least one parameter is less than a target value for the parameter, the controller is configured to deliver no water into the compression cylinder; and when the indication of the at least one parameter is equal to or greater than the target value for the parameter, the controller is configured to control delivery of the mass of water delivered from the reservoir to the compression cylinder based on the indication of the at least one parameter such that during a compression stroke the water absorbs, via both sensible heat and latent heat, a rise in temperature caused by the compression stroke such that the water vaporises into its gaseous phase during the compression stoke and a rise in temperature caused by the compression stroke is limited by the absorption of heat by the water.

In another aspect of the disclosure there is provided a split cycle internal combustion engine comprising a combustion cylinder accommodating a combustion piston and a compression cylinder accommodating a compression piston and being arranged to provide compressed fluid to the combustion cylinder, the compression cylinder being coupled to a water reservoir. The split cycle internal combustion engine also comprises a controller arranged to receive an indication of at least one parameter associated with the combustion cylinder and/or a fluid associated therewith and to control the mass of water delivered into the compression cylinder based on the indicated parameter such that:

when the indicated parameter is less than a target value for the parameter, the controller is configured to deliver no water into the compression cylinder; and when the indicated parameter is equal to or greater than the target value for the parameter, the controller is configured to control delivery of the mass of water delivered from the reservoir to the compression cylinder based on the indication of the at least one parameter such that during a compression stroke the water absorbs, via both sensible heat and latent heat, a rise in temperature caused by the compression stroke such that the water vaporises into its gaseous phase during the compression stoke and a rise in temperature caused by the compression stroke is limited by the absorption of heat by the water.

Advantageously such an arrangement may mean that water is not wasted unnecessarily cooling the working fluid when the engine is, for example, cold when just starting, but is only used when the engine is running at a sufficiently warm temperature to warrant the use of the water to act as a coolant to improve charge density.

The indication of the at least one parameter may comprise an indication of a temperature associated with the combustion cylinder and/or a fluid associated therewith, and the target value for the parameter is a target temperature.

The compression cylinder may comprise an inlet for drawing in air to the cylinder, and an outlet for exhausting compressed working fluid out of the compression cylinder, and wherein the compression cylinder comprises an injector located between the inlet and the outlet for delivering water into the compression cylinder. The injector may be located on a face of the compression cylinder opposing the working surface of the compression piston. In some example the compression cylinder comprises a pair of injectors.

The combustion cylinder may be coupled to a fuel reservoir, and the controller may be configured to control delivery of the fuel to the combustion cylinder based on the indication of the at least one parameter. The controller may be configured to control delivery of fuel based on the mass of water delivered to the compression cylinder. In some examples the controller is configured to control delivery of fuel and water such that the ratio of delivered fuel to delivered water is within a selected range. In some examples the controller is configured to control delivery of fuel and water such that the ratio of delivered fuel to delivered water is substantially constant.

In another aspect of the disclosure there is provided a method of operating a split cycle internal combustion engine. The engine comprises a combustion cylinder accommodating a combustion piston, and a compression cylinder accommodating a compression piston and being arranged to receive air and compress the air to provide a compressed working fluid to the combustion cylinder for combustion, the compression cylinder being coupled to a water reservoir. The method comprises receiving an indication of at least one parameter associated with the engine and/or a fluid associated therewith, and controlling delivery of the mass of water delivered from the reservoir to the compression cylinder based on the indication of the at least one parameter such that during a compression stroke the water absorbs, via both sensible heat and latent heat, a rise in temperature caused by the compression stroke such that the majority of the water vaporises into its gaseous phase during the compression stoke and a rise in temperature caused by the compression stroke is limited by the absorption of heat by the water. The delivery of the mass of water is controlled such that the mass of water in the compressed working fluid at the end of the compression stroke results in a level of water concentration in the compressed working fluid that is less than a threshold water concentration level.

It will be understood that the total mass of water in the compressed working fluid at the end of the compression stroke comprises water in both liquid and gaseous forms. However, in other examples, the method may comprise controlling the delivery of the mass of water such that the mass of liquid water in the compressed working fluid at the end of the compression stroke is less than a threshold (liquid) water concentration level. The threshold water concentration level may be determined based on the maximum concentration of water in the compressed working fluid that is capable of sustaining combustion in the combustion cylinder.

The indication of at least one parameter may comprises an indication of a temperature associated with the combustion cylinder and/or a fluid associated therewith, for example, the temperature of an exhaust emitted from the combustion cylinder.

The compression cylinder may comprise an outlet port and the combustion cylinder comprises an inlet port coupled to the outlet port of the compression cylinder via a recuperator for receiving a compressed fluid therefrom, wherein the recuperator is arranged to raise the temperature of the compressed fluid delivered to the combustion cylinder, and wherein the indication of the at least one parameter comprises at least one of (i) a temperature, (ii) a pressure, and (iii) an oxygen concentration of the fluid in the recuperator. The recuperator may be operable to raise the temperature of the working and/or more actively control it (e.g. via both raising it and/or lowering it). If the indication of the at least one parameter comprises a temperature, this could be the temperature of the recuperator inlet (i.e. the inlet that receives the compressed working fluid from the compression cylinder). The method may comprise controlling the delivery of water to the recuperator to control the temperature of the compressed working fluid in the recuperator—this may be directly (e.g. via direct delivery into the recuperator) and/or by delivering an excess of water to the compression cylinder such that more is received by the recuperator.

The indication of at least one parameter may additionally or alternatively comprises a desired power output of the engine. This may be determined, for example, based on the depression of a gas pedal and/or on a fuel demand. For example, the method may comprise controlling the mass of water to be delivered based on (for example, proportional to) the amount of fuel that will be delivered to the compressed working fluid in the combustion cylinder.

The indication of the at least one parameter may additionally or alternatively comprise an oxygen concentration associated with the engine or a fluid therein.

In some examples the indication of the at least one parameter comprises at least one of (i) the temperature of the water being delivered to the compression cylinder, (ii) the temperature of the air being delivered to the compression cylinder, (iii) the humidity of the air being delivered to the compression cylinder, and (iv) the ambient air pressure. For example, if the ambient air pressure is lower, the air may be drier and so it may be determined that relatively more water can be absorbed by the working fluid and combustion still be maintained in the downstream combustion cylinder. For example, the water carrying potential of the air being admitted to the compression cylinder may be determined and accordingly the mass of water to be delivered may be determined based on the determined water carrying potential.

In some examples the method comprises controlling the delivery of water that the mass of water in the compressed working fluid in the combustion cylinder has a level of water concentration less than a maximum combustion water concentration level, wherein the maximum combustion water concentration level is the maximum concentration of water in the compressed working fluid that is capable of sustaining combustion and above which would prevent combustion from occurring.

In some examples the method may comprise operating a heating means to control the temperature of the water delivered to the compression cylinder. For example, the temperature of the delivered water may be controlled such that it is below (and/or within a selected range of) the boiling point of water for the pressure it is being delivered at. The heating means may, for example, comprise a heat exchanger and may be coupled to a radiator/HVAC (heating ventilation and air conditioning) system of the vehicle. In some examples the heating means may comprise two heating means—one to heat a tank or reservoir of water to a first selected temperature, and the other to heat the water up to a second higher temperature for delivery to the compression cylinder.

In some examples the method comprises determining the time taken for the delivered water to boil from the moment that it is delivered into the compression cylinder. In such examples the method may comprise controlling the temperature of the delivered water such that the determined time taken for the delivered water to boil is within a selected water boil time range. The method may comprise determining the time taken for the delivered water to boil, for example, by reference to lookup table (LUT), that may, for example, list known relationships between parameters such as pressure, humidity and temperature.

The method may comprise controlling the pressure of water delivered to the compression cylinder based on at least one of (i) the determined mass of water delivered, and (ii) an indication of a parameter associated with the engine or a fluid therein. It will be understood that the indication of a parameter used for controlling pressure could be the same parameter used for determining the mass of water to be delivered, or the indication of a parameter used for controlling pressure could be a different parameter.

In some examples the method comprises controlling the range of droplet sizes of water delivered to the compression cylinder. The range of droplet sizes may be controlled, for example, to alter the extent to which they are projected through the compression cylinder. The range of droplet sized may be controlled as a function of the determined mass, the pressure and/or the duration of delivery. For example, the range of droplet sizes may vary inversely as a function of delivery duration, so that for shorter deliveries the droplets are larger on average than for longer delivery durations where the droplets may be smaller on average. Additionally or alternatively an additive may be added to the coolant to affect the surface tension of the coolant and thereby alter the range of droplet sizes, and/or an electric field may be applied to the coolant to affect the surface tension of the coolant and thereby alter the range of droplet sizes.

The method may comprise controlling the duration of water delivery to the compression cylinder based on at least one of (i) the determined mass of water delivered, and (ii) an indication of a parameter associated with the engine or a fluid therein. It will be understood that the indication of a parameter used for controlling pressure could be the same parameter used for determining the mass, or the indication of a parameter used for controlling pressure could be a different parameter.

The method may comprise controlling the timing of water delivery relative to the crank angle of the compression piston during the compression cycle based on the indication of the at least one parameter. For example, the method may comprise controlling the timing of water delivery based on the temperature of water being delivered and/or air temperature (e.g. if the water and/or incoming air is cooler the water is injected closer to BDC, if the water and/or incoming air is warmer it is injected closer to TDC). For example, if the engine is just starting up after rest then the heating means (if present) may not be effective at heating the water up to the selected temperature initially, and so the controller may alter the timing of water delivery accordingly.

The compression cylinder may comprise an inlet for drawing in air to the cylinder, and an outlet for exhausting compressed working fluid out of the compression cylinder, and wherein the compression cylinder comprises an injector located between the inlet and the outlet for delivering water into the compression cylinder. The injector may be located on a face of the compression cylinder opposing the working surface of the compression piston. In some example the compression cylinder comprises a pair of injectors.

The combustion cylinder may be coupled to a fuel reservoir, and the method may comprise controlling delivery of the fuel to the combustion cylinder based on the indication of the at least one parameter. The method may comprise controlling delivery of fuel based on the mass of water delivered to the compression cylinder. In some examples the delivery of fuel and water may be controlled such that the ratio of delivered fuel to delivered water is within a selected range. In some examples the delivery of fuel and water may be controlled such that the ratio of delivered fuel to delivered water is substantially constant.

In another aspect of the disclosure there is provided a method of operating a split cycle internal combustion engine, the split cycle internal combustion engine comprising:
  a combustion cylinder accommodating a combustion piston;
  a compression cylinder accommodating a compression piston and being arranged to provide compressed fluid to the combustion cylinder, the compression cylinder being coupled to a water reservoir;
the method comprising:
  receiving an indication of at least one parameter associated with the combustion cylinder and/or a fluid associated therewith and controlling the mass of water delivered into the compression cylinder in based on the indicated parameter such that:
    when the indicated parameter is less than a target value for the parameter, no water is delivered into the compression cylinder; and
    when the indicated parameter is equal to or greater than the target value for the parameter, the delivery of the mass of water delivered from the reservoir to the compression cylinder is controlled based on the indication of the at least one parameter such that during a compression stroke the water absorbs, via both sensible heat and latent heat, a rise in temperature caused by the compression stroke such that the water vaporises into its gaseous phase during the compression stoke and a rise in temperature caused by the compression stroke is limited by the absorption of heat by the water.

Advantageously such an arrangement may mean that water is not wasted unnecessarily cooling the working fluid when the engine is, for example, cold when just starting, but is only used when the engine is running at a sufficiently warm temperature to warrant the use of the water to act as a coolant to improve charge density.

The indication of the at least one parameter may comprise an indication of a temperature associated with the combustion cylinder and/or a fluid associated therewith, and the target value for the parameter is a target temperature.

The compression cylinder may comprise an inlet for drawing in air to the cylinder, and an outlet for exhausting compressed working fluid out of the compression cylinder, and wherein the compression cylinder comprises an injector located between the inlet and the outlet for delivering water into the compression cylinder. The injector may be located on a face of the compression cylinder opposing the working surface of the compression piston. In some example the compression cylinder comprises a pair of injectors.

The combustion cylinder may be coupled to a fuel reservoir, and the method may comprise controlling delivery of the fuel to the combustion cylinder based on the indication of the at least one parameter. The method may comprise controlling the delivery of fuel based on the mass of water delivered to the compression cylinder. In some examples the method may comprise controlling delivery of fuel and water such that the ratio of delivered fuel to delivered water is within a selected range. In some examples the method may comprise controlling delivery of fuel and water such that the ratio of delivered fuel to delivered water is substantially constant.

In another aspect of the disclosure there is provided a non-transitory computer readable medium comprising computer program instructions configured to program a processor to perform the method of any of the aspects described above.

DRAWINGS

Figure 2:
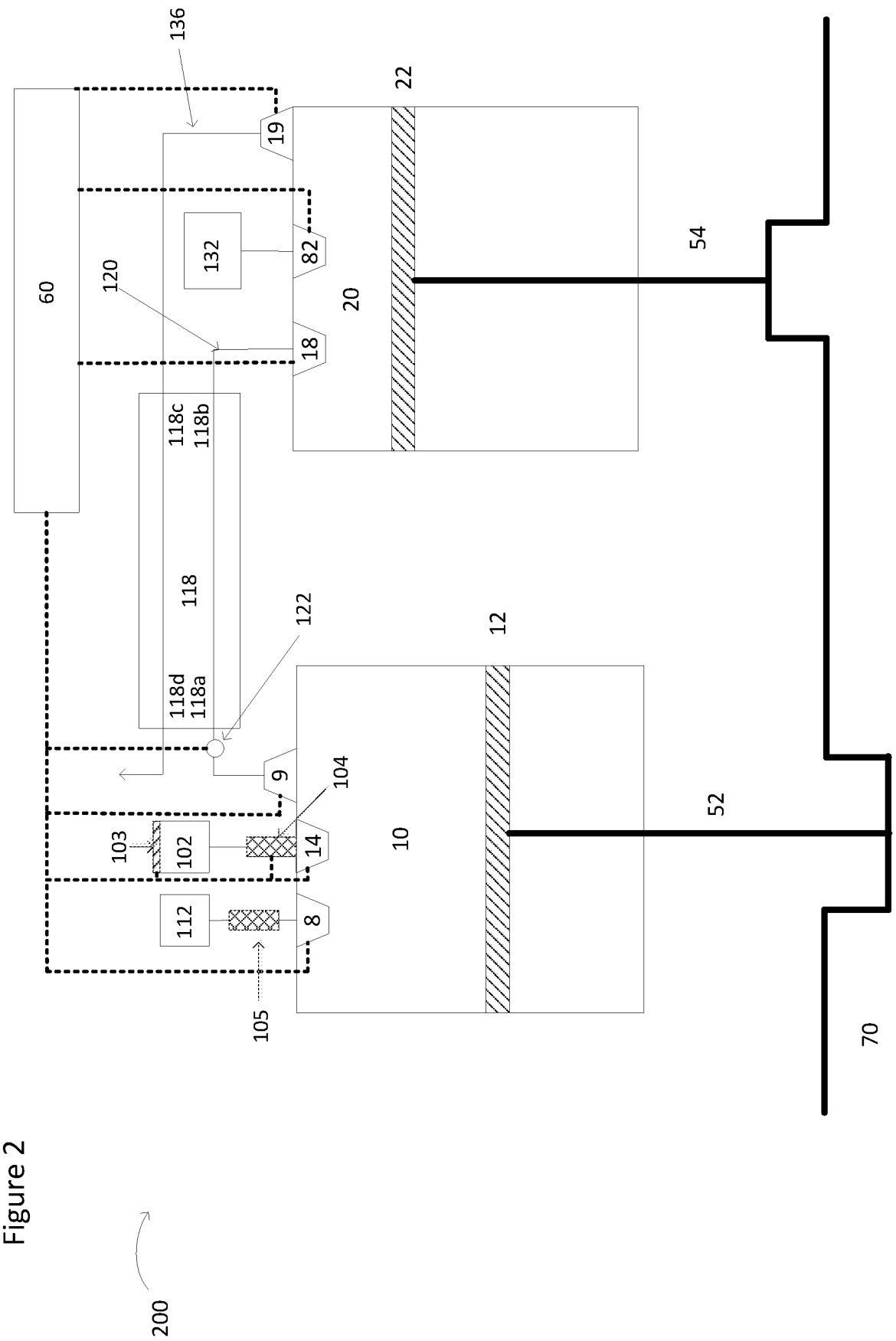
Figure 3:
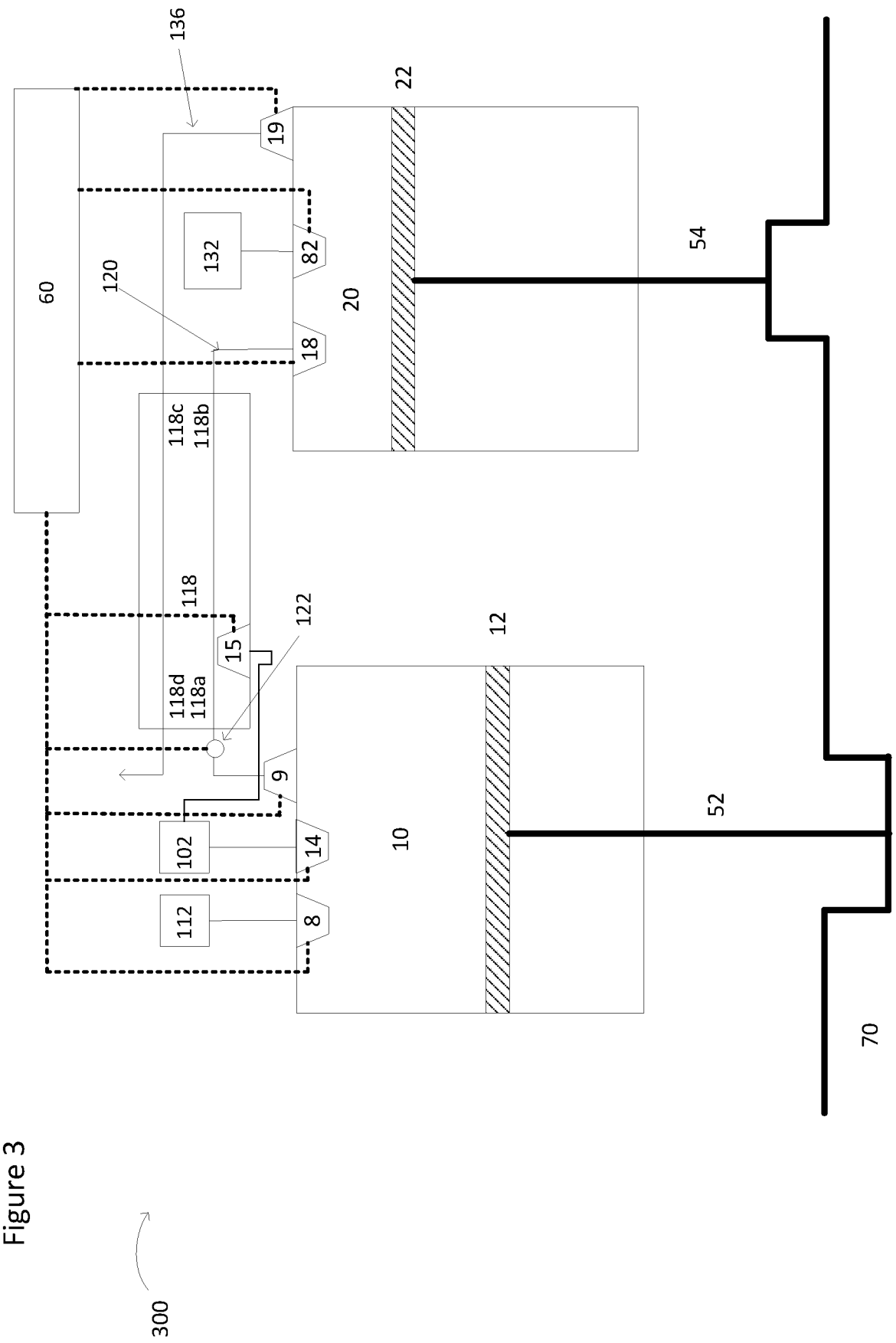
Figure 4:
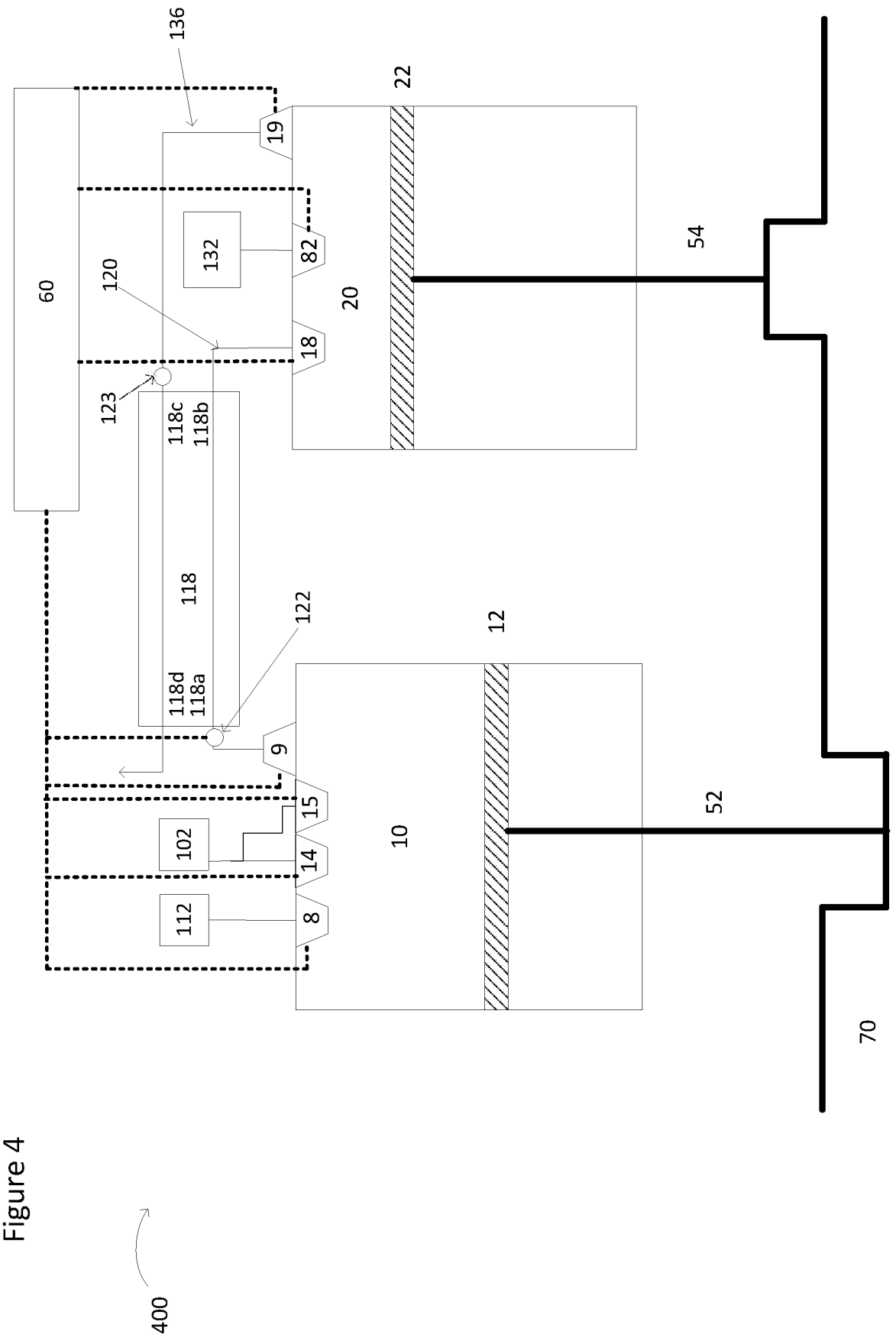
Figure 5:
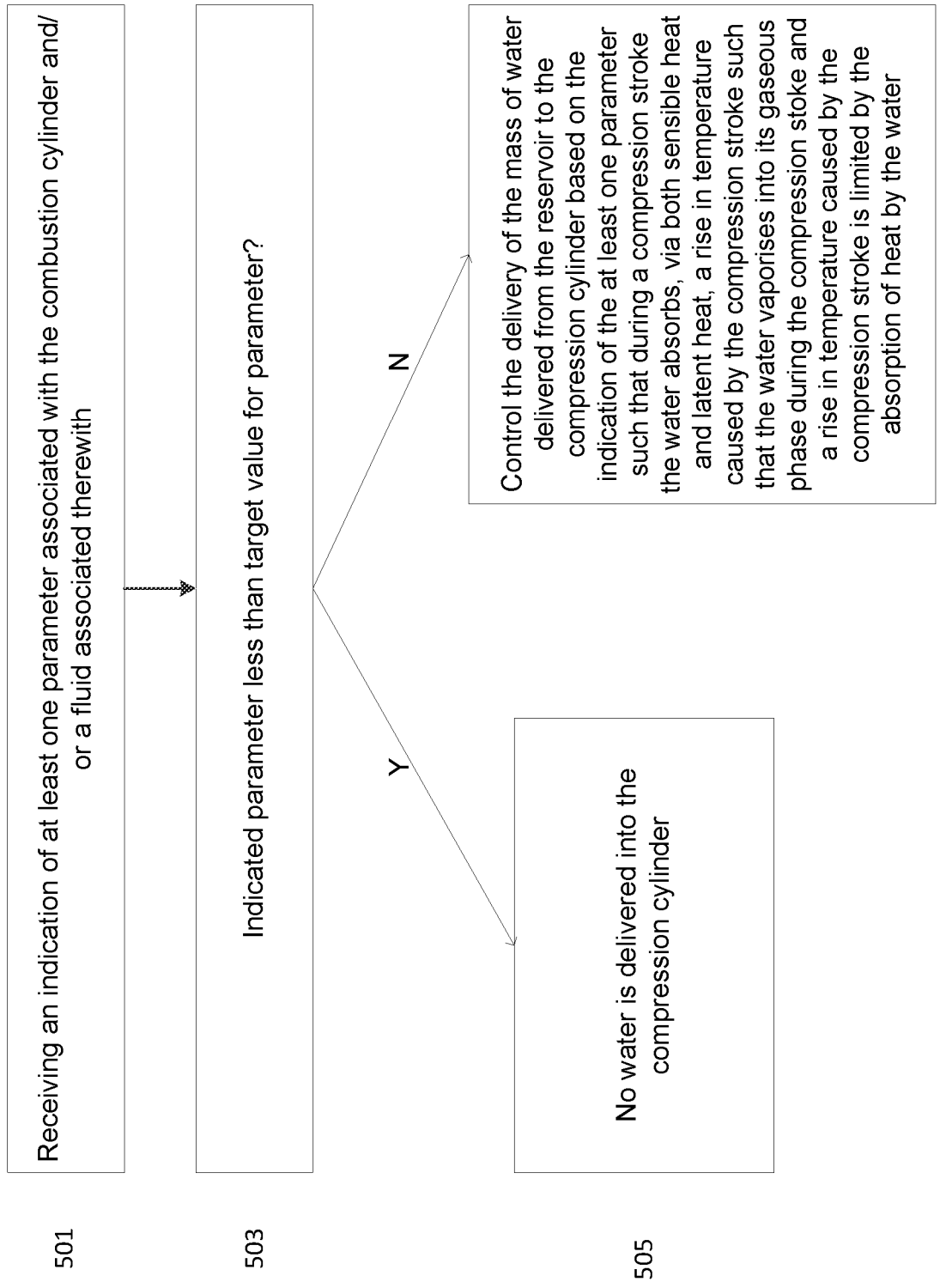
Figure 6:
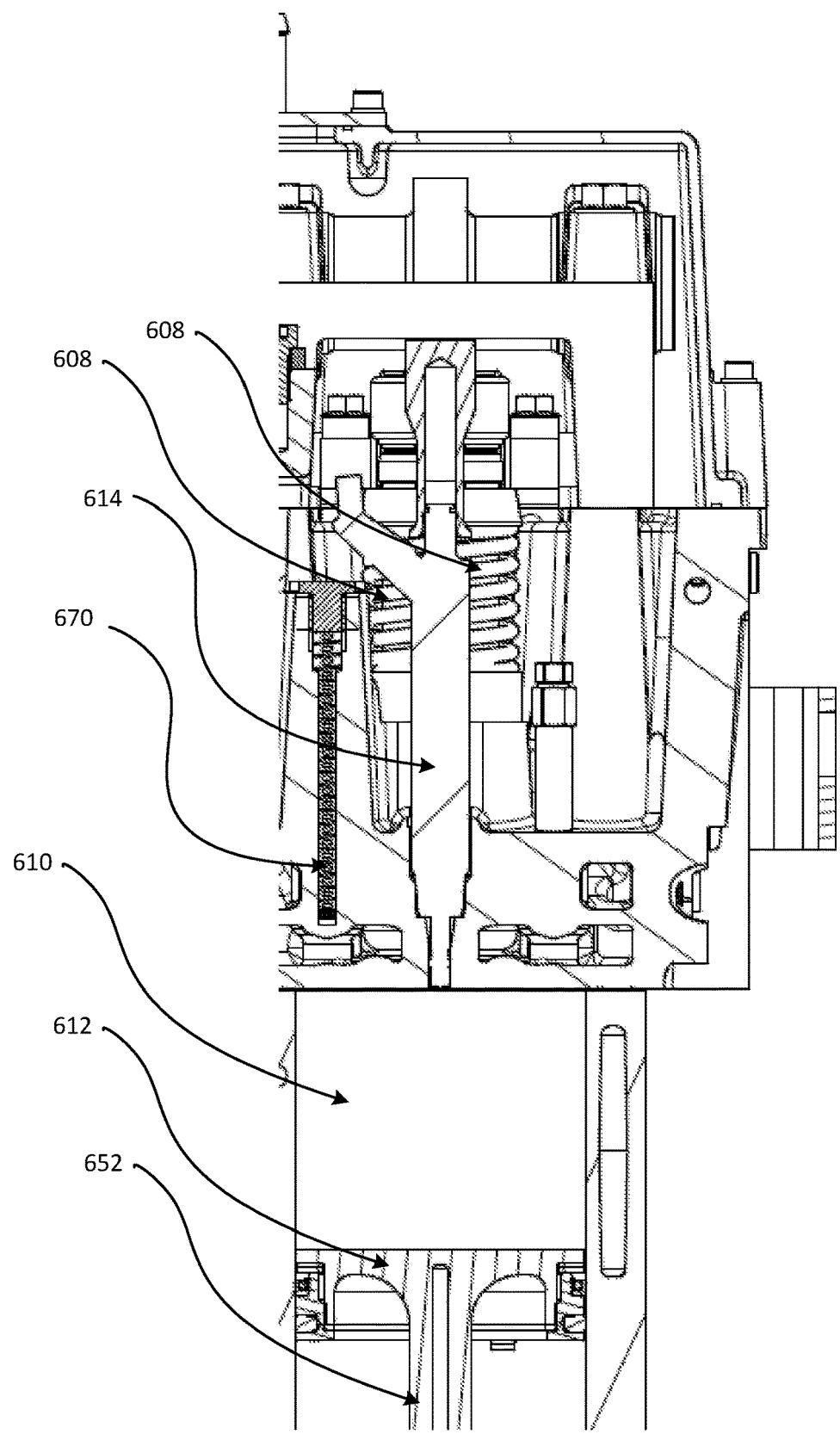

Embodiments of the disclosure will now be described, by way of example only, with reference to the accompanying drawings, in which:
  FIG. 1 shows a schematic diagram of an exemplary split cycle internal combustion engine apparatus; and
  FIG. 2 shows a schematic diagram of another exemplary split cycle internal combustion engine apparatus;
  FIG. 3 shows a schematic diagram of another exemplary split cycle internal combustion engine apparatus;
  FIG. 4 shows a schematic diagram of another exemplary split cycle internal combustion engine apparatus;
  FIG. 5 shows a flow chart for a method of operating a split cycle internal combustion engine apparatus, such as the apparatus shown in any of FIGS. 1 to 4 and 6; and
  FIG. 6 shows a cross-section of a portion of another exemplary split cycle internal combustion engine apparatus.

SPECIFIC DESCRIPTION

FIG. 1 shows a first example of a split cycle internal combustion engine 100 arranged to control a mass of water delivered to a compression cylinder 10 such that during a compression stroke the water absorbs heat via both sensible heat and latent heat, and such that the mass of water in the compressed working fluid at the end of the compression stroke results in a level of water concentration in the compressed working fluid that is less than a threshold water concentration level.

The engine 100 is arranged to provide an indication of parameter, such as an indication of a temperature associated with the combustion cylinder and/or a fluid associated therewith, to a controller 60 which determines, based on this indication, the mass of water to be delivered to the compression cylinder 10. The controller 60 may operate based on a feedback loop which controls the delivery of water from a reservoir 102 such that the concentration of water in the compressed working fluid is within a selected range. This may enable the temperature of combustion in the combustion cylinder 20 to be controlled so that, for example, generation of NOx compounds may be inhibited.

As illustrated, FIG. 1 shows a split cycle internal combustion engine 100 apparatus comprising a compression cylinder 10 and a combustion cylinder 20. The compression cylinder 10 accommodates a compression piston 12, which is connected via a connecting rod 52 to a respective crank on a portion of a crank shaft 70. The combustion cylinder 20 accommodates a combustion piston 22, which is coupled via a connecting rod 54 to a respective crank on a portion of the crank shaft 70. The compression cylinder 10 is coupled to the combustion cylinder 20 via a crossover passage which in the example shown is a recuperator 118, but it will be understood that the presence of a recuperator is optional. The compression cylinder 10 comprises an inlet port 8 for receiving air from outside the engine 100 (optionally via a turbocharger 112 to receive a compressed air supply), and an outlet port 9 coupled to the recuperator 118. In examples where there is an optional turbocharger 112, it will be understood that the turbocharger 112 may be coupled to the exhaust pathway 136 (as described in more detail below) to drive a turbine to drive the turbocharger 112 using exhaust from the combustion cylinder 20. The outlet port 9 comprises a non-return valve so that compressed air cannot flow back into the compression cylinder 10. The recuperator 118 thus comprises a first (high pressure) inlet port 118*a* for receiving compressed working fluid from the compression cylinder 10, a first (high pressure) outlet port 118*b* for delivering compressed working fluid to the combustion cylinder 20, a second (low pressure) inlet port 118*c* for receiving exhaust from the combustion cylinder 20, and a second (low pressure) outlet port 118*d* for releasing exhaust to ambient.

The combustion cylinder 20 comprises an inlet port 18, which is coupled to the first (high pressure) outlet port 118*b* of the recuperator 118, and an exhaust port 19 coupled to the second (low pressure) inlet port 118*c* of the recuperator 118 for passing exhaust from the combustion cylinder 20 to an exhaust via the recuperator 118. These couplings provide an air flow path for air between the compression cylinder 10 and the combustion cylinder via the recuperator 118.

The engine 100 also comprises a coolant system, which in the example shown is water coolant system configured to deliver liquid water. The coolant system is illustrated as comprising a liquid coolant reservoir 102 coupled to the compression cylinder 10 via a coolant injector 14, which defines a liquid flow path (it will be understood that in some examples there may be a plurality of coolant injectors 14, such as a pair of coolant injectors). In the example shown in FIG. 1, the coolant injector 14 is located between the inlet 8 and the outlet 9 for delivering water into the compression cylinder 10, and in the example shown in FIG. 1 the coolant injector 14 is located on a face of the compression cylinder 10 opposing the working surface of the compression piston 12. It will be understood that if the compression cylinder 10 comprises a plurality of coolant injectors 14, that these too may also be located between the inlet 8 and outlet 9 on a face of the compression cylinder 10 opposing the working surface of the compression piston 12.

As will be described in the context of the example shown in FIG. 3, the coolant system may optionally also comprise an injector for injecting coolant into the recuperator 118, although this is not illustrated in FIG. 1.

The engine 100 also comprises a fuel reservoir 132 coupled to the combustion cylinder 20 via a fuel injector 82 so that a fluid flow path is defined between the fuel reservoir 132 and the combustion cylinder 20.

The engine 100 comprises a controller 60 and at least one sensor 122 coupled to the controller 60. In examples, the at least one sensor 122 could be a temperature sensor, a pressure sensor, an oxygen concentration sensor or any combination thereof. In the example shown, the controller 60 is also coupled to the coolant injector 14, and the fuel injector 82 and/or reservoir 80. In the example shown in FIG. 1, the controller 60 is also coupled to the inlet port 8 of the compression cylinder 10 and the outlet port 9 of the compression cylinder 10 (as well as the injector 14), and the inlet port 18 of the combustion cylinder 20 and the exhaust port 19 of the combustion cylinder 20 to control the delivery and exhaust of working fluid to and from the compression cylinder 10 and/or the combustion cylinder 20.

It is to be appreciated that the sensor 122 illustrated is only exemplary and there could be a different number of sensors or they could be placed in different locations. In the example shown in FIG. 1 the sensor 122 is located on the high-pressure inlet port 118*a* of the recuperator 118, and is configured to determine a parameter of the working fluid as it travels from the compression cylinder outlet 9 into the recuperator 118. The sensor 122 could be coupled to the controller 60 through physical wires or could be connected wirelessly. However, it will also be understood that the engine 100 may comprise additional or alternative sensors. For example, the other ports 118*b*, 118*c*, 118*d* of the recuperator 118 may have sensors and/or there may be sensors configured to monitor a parameter of the fluid as it flows through the recuperator 118. In some examples the inlet port 8 may comprise a temperature sensor, and/or there may be a compression sensor 11 within the compression cylinder 10. There may, for example, additionally or alternatively be a sensor mounted proximate to the air inlet port 8 or proximate to the coolant injector 14, and/or an exhaust sensor downstream of the exhaust port 19 of the combustion cylinder 20. In some examples, the liquid coolant reservoir 102 may also comprise a sensor, for example, for measuring a quantity, such as mass, and/or a temperature, of liquid contained in the reservoir 102.

The engine 100 is arranged such that air is drawn into the compression cylinder 10 through the inlet port 8 of the compression cylinder 10. The air may have been compressed via a turbocharger and/or cooled via an intercooler prior to admission to the compression cylinder 10. The compression piston 12 is arranged to compress this air to create a compressed working fluid, and during the compression phase, liquid coolant such as water may be added into the compression cylinder 10. Along the path 120 between the compression cylinder outlet port 9 and the combustion cylinder inlet port 18, compressed working fluid passes through the recuperator 118. The recuperator 118 is arranged to receive the compressed working fluid from the outlet port 9 of the cylinder via the first (high pressure) inlet port 118*a* and pass it from the first (high pressure) outlet port 118*b* and into the combustion cylinder 20 via the combustion cylinder inlet port 18. The recuperator 118 is operable to be heated by exhaust gases from the combustion cylinder exhaust port 19 passing along an exhaust pathway 136 to an exhaust outlet (not shown), and as such the recuperator 118 may be arranged to raise the temperature of the compressed fluid delivered to the combustion cylinder 20. However in some examples it will be understood that the recuperator 118 may additionally or alternatively be arranged to lower the temperature of the compressed fluid delivered to the combustion cylinder 20, and so the recuperator 118 may in some examples be configured to control the temperature of the compressed fluid to delivered to the combustion cylinder 20, for example to keep the temperature of the compressed fluid to within a selected range and/or to keep the temperature of the compressed fluid below a selected threshold temperature. This may help to reduce NOx formation in the combustion cylinder 20 and/or prevent material damage to the recuperator 118 occurring.

The engine 100 is further arranged to add fuel from the fuel reservoir 132 to the working fluid in the combustion cylinder 20 via the fuel injector 82, and combust the mixture of fuel and working fluid (for example via operation of an ignition source, not shown) to extract useful work via turning of the crankshaft 70.

The sensor 122 is configured to send at least one signal to the controller 60 providing an indication of at least one parameter associated with the engine 100 and/or a fluid associated therewith. In some examples, the indication of the at least one parameter may comprise at least one of (i) a temperature, (ii) a pressure, and (iii) an oxygen concentration of the fluid in the recuperator 118.

The controller 60 is arranged to receive an indication of at least one parameter associated with the engine 100 and/or a fluid associated therewith, and control delivery of the mass of water delivered from the reservoir 102 to the compression cylinder 10 based on the indication of the at least one parameter such that during a compression stroke the water absorbs, via both sensible heat and latent heat, a rise in temperature caused by the compression stroke such that at least some of, and generally a majority of (and optionally all of) the water vaporises into its gaseous phase during the compression stoke and a rise in temperature caused by the compression stroke is limited by the absorption of heat by the water. Furthermore, the controller 60 is configured to control the delivery of the mass of water such that the mass of water in the compressed working fluid at the end of the compression stroke results in a level of water concentration in the compressed working fluid that is less than a threshold water concentration level. The threshold water concentration level may be determined based on the maximum concentration of water in the compressed working fluid that is capable of sustaining combustion in the combustion cylinder 20.

To ensure that the water absorbs a rise in temperature caused by the compression stroke via both sensible heat and latent heat, the controller 60 may be configured to control the temperature of the delivered water such that it is below the boiling point of water for the pressure it is being delivered at. This means that there is still "room" or a selected temperature range for the temperature of the water to travel through (via sensible heat) before it starts absorbing heat via latent heat and boils. As will be described in more detail below with reference to FIG. 2, in some examples the engine 100 may further comprise means for heating the water prior to its delivery to the compression cylinder 10.

In the example shown in FIG. 1, the sensor 122 is configured to provide an indication of a temperature associated with the compression cylinder and/or a fluid associated therewith—in the example shown in FIG. 1 this being the temperature of the working fluid flowing into the first (high pressure) inlet port 118*a* of the recuperator 118. This sensor 122 is operable to sense the temperature of the compressed working fluid and report sensed temperature data back to the controller 60. The controller 60 is arranged to receive this temperature data and control the delivery of the mass of water delivered to the compressing cylinder 10 via the coolant injector 14 based at least in part on the received temperature data.

The fuel reservoir 132 and/or the fuel injector 82 is coupled to the controller 60 so that the controller 60 is operable to control the delivery of fuel into the combustion cylinder 20. In some examples, the controller 60 is configured to determine the amount of fuel to be injected. This may be based on the mass of water delivered to the compression cylinder 10, and/or a received indication of at least one parameter of the engine 100—for example, this could be the same parameter used for determining the mass of water to be delivered to the compression cylinder 10, or could be a different parameter. For example, the controller 60 may be configured to obtain the indication of the at least one parameter via a signal received from an exhaust sensor (for example coupled to the exhaust pathway 136). In some examples a combination of parameters may be used. In some examples the controller 60 is configured to control delivery of fuel based on the mass of water delivered to the compression cylinder 10, for example such that the ratio of delivered fuel to delivered water is within a selected range (e.g. the selected range could be such that the ratio of fuel to water is substantially constant).

In the example shown in FIG. 1, the controller 60 is also coupled to the inlet port 8 of the compression cylinder 10 and the outlet port 9 of the compression cylinder (as well as the injector 14) and is operable to control the timings of the inlet of air to the compression cylinder 10, the delivery of water to the compression cylinder 10, and the outlet of compressed working fluid to the recuperator 118. The controller 60 may be operable to control the timings of the inlet of air to the compression cylinder 10, the delivery of water to the compression cylinder 10, and the outlet of compressed working fluid to the recuperator 118 based on an indication of at least one parameter associated with the compression cylinder 10, the recuperator 118 and/or the combustion cylinder 20, and/or a fluid associated therewith. This indication of at least one parameter may be the same parameter used to determine the mass of water to be delivered to the compression cylinder and/or a different parameter. In some examples a combination of parameters may be used.

In the example shown in FIG. 1, the controller 60 is also coupled to the inlet port 18 of the combustion cylinder 20 and the exhaust port 19 to control the delivery and exhaust of working fluid to and from the combustion cylinder 20. The controller 60 may be operable to control the timings of the inlet of working fluid to the combustion cylinder 20, the delivery of fuel to the combustion cylinder 20, and the exhaust of working fluid based on an indication of at least one parameter associated with the compression cylinder 10, the recuperator 118 and/or the combustion cylinder 20, and/or a fluid associated therewith. The controller 60 may be operable to control the timings of the inlet of compressed working fluid to the combustion cylinder 20, the delivery of fuel to the combustion cylinder 20, and the outlet of exhaust to the exhaust pathway 136 based on an indication of at least one parameter associated with the compression cylinder 10, the recuperator 118 and/or the combustion cylinder 20, and/or a fluid associated therewith. This indication of at least one parameter may be the same parameter used to determine the mass of water to be delivered to the compression cylinder 10 and/or a different parameter. In some examples a combination of parameters may be used.

In operation, the controller 60 receives an indication of at least one parameter associated with the engine 100 and/or a fluid associated therewith. The indication is received as a signal received from at least one sensor, such as the sensor 122 illustrated in FIG. 1.

Based on this received indication of at least one parameter associated with the engine 100 and/or a fluid associated therewith, the controller 60 determines a mass of water to deliver to the compression cylinder 10. The controller 60 makes this determination such that the mass of water in the compressed working fluid at the end of the compression stroke results in a level of water concentration in the compressed working fluid that is less than a threshold water concentration level. This may be so that the compressed working fluid that is exhausted from the compression cylinder 10 is still capable of sustaining combustion when it is fed to the combustion cylinder 20.

The controller 60 thus controls delivery of the mass of water delivered from the reservoir 102 to the compression cylinder 10 based on the indication of the at least one parameter such that during a compression stroke the water absorbs, via both sensible heat and latent heat, a rise in temperature caused by the compression stroke such that the majority of the water vaporises into its gaseous phase during the compression stoke and a rise in temperature caused by the compression stroke is limited by the absorption of heat by the water. The delivery of the mass of water is controlled by the controller 60 such that the mass of water in the compressed working fluid at the end of the compression stroke results in a level of water concentration in the compressed working fluid that is less than a threshold water concentration level.

At the end of the compression stroke, the compressed working fluid, containing a mixture of liquid water and water vapour (but mainly water vapour) is exhausted through compression cylinder outlet port 9 and into the first (high pressure) inlet port 118a of the recuperator 118 (it will however be understood that in some examples the compressed working fluid may comprise only water vapour and in some examples no water at all). The compressed working fluid is heated (although in some examples the compressed working fluid may be cooled, such as if it is warmer than a selected threshold temperature) such that its temperature raises, and is then exhausted through the first (high pressure) outlet port 118b of the recuperator 118. The heated compressed working fluid is then fed through the pathway 120 and into the combustion cylinder 20 via combustion cylinder inlet port 18. The heated compressed working fluid is combusted, and useful work is extracted.

After combustion occurs in the combustion cylinder 20, the exhaust gas leaves the combustion cylinder 20 via the combustion cylinder exhaust port 19 and travels along exhaust pathway 136 coming into thermal communication with the recuperator 118 to heat compressed fluid travelling along the pathway 120 between the compression cylinder outlet port 9 and the combustion cylinder inlet port 18.

As noted above, in some examples the engine 100 may further comprise means for heating the water prior to its delivery to the compression cylinder 10. It will be understood that in such examples the controller 60 may be configured to operate the heating means to control the temperature of the water delivered to the compression cylinder 10.

The example engine 200 shown in FIG. 2 is in many respects similar to the example engine 100 shown in FIG. 1. However, the example shown in FIG. 2 further shows optional reservoir heater 103 and optional pre-heater 104. In the example shown in FIG. 2 the reservoir heater 103 is coupled to the coolant reservoir 102 for heating the liquid (in this example, water) in the coolant reservoir 102. The pre-heater 104 is coupled to the flow path of liquid coolant between the reservoir 102 and the coolant injector 14, immediately adjacent to the coolant injector 14, for heating the liquid coolant as it flows into the coolant injector 104. Although both the reservoir heather 103 and pre-heater 104 are shown in FIG. 2, it will be understood that either or even neither heater 130, 104 may be present.

The reservoir heater 103 may be operable to heat the water up to a first selected threshold temperature—for example so that that water is warm (e.g. above 30 degrees centigrade) but not hot. They may also serve to help prevent the water from freezing in cold environments when the engine is not in use for an extended period of time. The reservoir heater 103 may, for example, be a heat-exchanger located in the water reservoir 102 and may be coupled to a waste source of heat from the engine 200—for example, the heating system for the vehicle, the recuperator 118, the intercooler etc.

The pre-heater 104 may be operable to further heat the water up to a selected threshold temperature or a selected temperature range so that the water is delivered to the compression cylinder 10 at a temperature close to but below the boiling point of the water at the pressure it is being injected at.

In the example shown in FIG. 2, the controller 60 is configured to operate both heating means 103, 104 to heat the water to a selected water threshold temperature that is below the boiling point of water for the pressure it is being delivered at. The controller 60 may do this by heating the water to within a selected range of the boiling point of water for the pressure it is being delivered at.

In some examples the controller 60 is configured to determine the time taken for the delivered water to boil from the moment that it is delivered into the compression cylinder 10, and control the temperature of the delivered water such that the determined time taken for the delivered water to boil is within a selected water boil time range. The controller 60 may do this based on a number of parameters that may be associated with the engine and/or a fluid associated therewith or even based on ambient parameters, such as the pressure of the liquid coolant, the ambient temperature, the ambient pressure, the ambient humidity. the controller 60 may be configured to determine the appropriate temperature to heat the liquid coolant to based on one or a plurality of parameters, for example by referencing a look up table (LUT) of known relationships between these parameters.

The example shown in FIG. 2 also shows optional intercooler 105 coupled between the turbocharger 112 and the inlet port 8 of the compression cylinder 10. The intercooler 105 may be operable to cool the compressed charged air fed from the turbocharger 112 to the compression cylinder 10. In some examples the intercooler 105 may further be coupled to the reservoir heater 103 and/or pre-heater 104 to heat the water being delivered to the compression cylinder 10.

In some examples the controller 60 is configured to control the delivery of water to the recuperator 118 to control the temperature of the compressed working fluid in the recuperator 118. The controller 60 may do this by adding an excess of water to the compression cylinder 10, or in the example of FIG. 3, by also delivering water to the recuperator via a recuperator coolant injector 15. In the example shown in FIG. 3, the recuperator 118 comprises a recuperator coolant injector 15 that is coupled in parallel with the coolant injector 14 to the coolant reservoir 102. The coolant injector 15 is also coupled to the controller 60 so that the controller 60 is operable to control operation of the recuperator coolant injector 15

In the example shown in FIG. 3, the controller 60 is configured to control the delivery of the mass of water to both the compression cylinder 10 and the recuperator 118 such that the compressed working fluid in the combustion cylinder 20 has a level of water concentration less than a maximum combustion water concentration level, wherein the maximum combustion water concentration level is the maximum concentration of water in the compressed working fluid that is capable of sustaining combustion and above which would prevent combustion from occurring.

The examples described above with reference to FIGS. 1 to 3 only comprise one coolant injector 14 in the compression cylinder 10, however it will be understood that in other examples there may be a plurality of coolant injectors 14. In the example shown in FIG. 4, the compression cylinder 10 comprises a pair of coolant injectors; a first coolant injector 14 and a second coolant injector 15. In the example shown the pair of coolant injectors 14, 15 are coupled in parallel to the coolant reservoir 102 and are also both coupled to the controller 60 so that the controller 60 is operable to control both coolant injectors 14, 15. The controller 60 may be operable to control the first and second coolant injectors 14, 15 independently of each other.

As noted above, in some examples the engine 100 may comprise a plurality of sensors for sensing different parameters of the engine 100 and/or a fluid associated therewith. In the example shown in FIG. 4, the engine 100 comprises a second sensor—in this case an exhaust sensor 123—on the flow path 136 between the exhaust port 19 of the combustion cylinder 20 and the second (low pressure) inlet port 118c of the recuperator 118. In the example shown in FIG. 4 the exhaust sensor 123 is proximate to the second (low pressure) inlet 118c of the recuperator 118 so as to provide an indication of the temperature of the exhaust entering the recuperator 118. This may be helpful to determine the peak temperature of combustion in the combustion cylinder 20 (the controller 60 may be configured to determine this from an indication of the temperature provided by the exhaust sensor 123) and the controller 60 may take mitigating action (such as by delivering more water to the working fluid, either via the compression cylinder 10 and/or the recuperator 118) to keep the temperature below a selected threshold temperature. This may help to reduce NOx formation and/or to prevent material damage to the recuperator 118.

In the example of FIG. 4 the indication of at least one parameter therefore may comprise an indication of a temperature associated with the combustion cylinder 20 and/or a fluid associated therewith—which in this example comprises the temperature of an exhaust emitted from the combustion cylinder 20.

In some examples (not shown in FIGS. 1 to 4) the exhaust port 19 of the combustion cylinder 20 may additionally or alternatively be coupled to a bypass flow path that bypasses the recuperator 118. For example, the controller 60 may be configured to vent exhaust via the bypass flow path if the recuperator reaches a selected threshold temperature (for example to preserve functioning of the recuperator 118 so that material damage to the recuperator 118 does not occur, and/or to help control the temperature of the working fluid passing from the compression cylinder 10 to the combustion cylinder 20 via the recuperator 118).

In some examples the indication of at least one parameter comprises a desired power output of the engine 100. For example, the desired power output may be determined based on a desired torque demand, which may in turn be determined based on a depression of a gas/accelerator pedal. Additionally or alternatively the desired power output may be determined based on an amount of fuel to be injected into the compressed working fluid in the combustion cylinder 20 for combustion.

In some examples the mass of water to be delivered to the compression cylinder 10 and/or recuperator 118 may be based on (for example, proportional to) the mass of fuel that will be used for the downstream combustion process in the combustion cylinder 20.

In some examples the indication of the at least one parameter comprises an oxygen concentration associated with the engine 100 or a fluid therein.

In some examples the indication of the at least one parameter comprises at least one of (i) the temperature of the water being delivered to the compression cylinder 10, (ii) the temperature of the air being delivered to the compression cylinder 10, (iii) the humidity of the air being delivered to the compression cylinder 10, and (iv) the ambient air pressure. For example, if the ambient air is at low pressure it may be inferred that the air has a low humidity and therefore is capable of receiving more water. The controller 60 may therefore be configured to control the delivery of water as a function of the ambient air pressure, the humidity of the ambient air, the temperature of the ambient air and/or the temperature of the water being delivered to the compression cylinder 10.

It will of course be understood that in many examples the controller 60 may be configured to control the mass of water to be delivered based on an indication of any one of or a combination of parameters.

In some examples the controller 60 is configured to control the pressure of water delivered to the compression cylinder based on at least one of (i) the determined mass of water delivered, and (ii) an indication of a parameter associated with the engine 100 or a fluid therein. it will be understood that the indication of a parameter used for controlling pressure could be the same parameter used for determining the mass of water, or it could be a different parameter.

In some examples the controller 60 is configured to control the range of droplet sizes of water delivered to the compression cylinder 10. The controller 60 may be configured to control the range of droplet sizes as a function of the determined mass of water to be delivered, the pressure and/or the injection duration.

In some examples an additive, for example an anionic (such as sodium lauryl sulfate), cationic (such as dodecyl trimethyl ammonium chloride) or nonionic (such as polyethylene glycol) additive, may be added to the coolant to affect the surface tension of the coolant and thereby alter the range of droplet sizes. The additive may be added into the coolant reservoir 102, and/or there may be a separate additive reservoir and the controller may be configured to control delivery of the additive along with the coolant via the coolant injector.

Additionally or alternatively, an electric field may be applied to the coolant to affect the surface tension of the coolant and thereby alter the range of droplet sizes. The electric field may be applied to the coolant immediately adjacent to its point of delivery to the compression cylinder 10, for example the electric field may be applied adjacent to the coolant injector 14.

Additionally or alternatively, in some examples a small quantity of fuel may be added to the coolant to create an emulsion. The quantity of fuel added to the coolant may be controlled such that the surface tension of the emulsion is within a selected range.

In some examples the controller 60 is configured to control the duration of water delivery to the compression cylinder 10 based on at least one of (i) the determined mass of water to be delivered, and (ii) an indication of a parameter associated with the engine 100 or a fluid therein. It will be understood that the indication of a parameter used for controlling pressure could be the same parameter used for determining the mass of water to be delivered, or it could be a different parameter.

In some examples the controller 60 is configured to control the timing of water delivery relative to the crank angle of the compression piston 12 during the compression cycle based on the indication of the at least one parameter. For example, the controller 60 may be configured to control the timing of water delivery (i.e. at which crank angle of piston—normally before 60 deg) based on the temperature of the water to be delivered, the recuperator 118 temperature and/or ambient air temperature. For example, if the water, recuperator 118 and/or incoming air is cooler (for example below a selected threshold temperature) the water is injected closer to bottom dead centre (BDC), and if the water, recuperator 118 and/or incoming air is warmer (for example above a selected threshold temperature) it is injected closer to top dead centre (TDC).

The above-mentioned sensor or sensors can be located in a multitude of places. In particular, one or more sensors may be placed near the inlet port 124 on the combustion cylinder as shown in FIG. 1, in the recuperator 118 or near the compression cylinder outlet port 116.

FIG. 5 shows a flow chart of an example method of controlling a split cycle internal combustion engine, such as the split cycle internal combustion engine of any of FIGS. 1 to 4 described above and FIG. 6 as described below. The method comprises receiving 501 an indication of at least one parameter associated with the combustion cylinder and/or a fluid associated therewith. A determination 503 is made as to whether or not the indication of the at least one parameter is less than a target value for the parameter. When the indicated parameter is less than a target value for the parameter, the no water is delivered 505 into the compression cylinder. When the indicated parameter is equal to or greater than the target value for the parameter, the delivery of the mass of water delivered from the reservoir to the compression cylinder is controlled 507 based on the indication of the at least one parameter such that during a compression stroke the water absorbs, via both sensible heat and latent heat, a rise in temperature caused by the compression stroke such that the water vaporises into its gaseous phase during the compression stoke and a rise in temperature caused by the compression stroke is limited by the absorption of heat by the water.

It will be understood that in some examples the above method may be implemented by control logic, such as the controller 60 described above with reference to FIGS. 1 to 4.

The indication of the at least one parameter may comprise an indication of a temperature associated with the combustion cylinder and/or a fluid associated therewith, and the target value for the parameter is a target temperature.

FIG. 6 shows a cross-section of a portion of another exemplary split cycle internal combustion engine apparatus. The portion shown in FIG. 6 shares many features in common with the split cycle internal combustion engine shown in FIGS. 1 to 4 and like reference numbers denote the same or similar features or functionality. It will also be understood that the engine shown in FIG. 6 can be controlled and may have the functionality of that described above with reference to FIGS. 1 to 5. The portion shown in FIG. 6 shows the compression cylinder 610 housing a compression piston 612 coupled to a connecting rod 652. At the top of the centre of the compression cylinder 610 there is a coolant injector 614 and behind this are two inlet valves 608 for admitting air to the compression cylinder 610 for compression by the compression piston 612. Although not shown in FIG. 6, it will be understood that there will also be two exhaust valves 609 for releasing compressed working fluid from the compressing cylinder 610 that mirror the inlet valves 608. Also shown in FIG. 6 is an optional pressure release valve 670 for releasing pressure from the compression cylinder 610 in the event that the pressure of the compressed working fluid exceeds a maximum threshold pressure.

As noted above, in some examples the distribution of droplet sizes may be controlled, for example by the controller 60 described above with reference to FIGS. 1 to 4. For example, larger droplets may be preferred than would conventionally be the case to ensure the water reaches the periphery of the chamber. This is slightly counter intuitive to other spray induced mixing phenomena where small droplets are generally preferred to promote mixing. In this case it is the desire to transfer the cooling media through the air that is more important hence the need for larger droplets than would be typical in for example an internal combustion engine fuel spray. That said, if the droplets are too large then the low surface area to volume ratio of the drops would hinder heat transfer between the water and gas increasing the velocity increases the work saving again by ensuring the injected water reaches the periphery of the chamber.

The importance of distributing the cooling water across the whole chamber is important to get the water to all parts of the chamber to provide effective cooling.

In general, without wishing to be bound by theory, it is hypothesised that large, fast droplets injected early in the compression stroke will be effective in getting the water from the injection point in the centre of the top of the compression cylinder 10 to the outer edges of the compression cylinder 10. Small droplets are likely to suffer from viscous drag and will not reach the outer edges of the compression cylinder 10 in time. However, some of the high momentum droplets do also impinge on the compression cylinder 10 wall. This is undesirable as this results in pooling of the water and ineffective heat transfer to the gas. There is therefore a complex trade-off between droplet momentum, spray distribution and injection timing.

With reference to the drawings in general, it will be appreciated that schematic functional block diagrams are used to indicate functionality of systems and apparatus described herein. It will be appreciated however that the functionality need not be divided in this way and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

It will be appreciated from the discussion above that the embodiments shown in the Figures are merely exemplary, and include features which may be generalised, removed or replaced as described herein and as set out in the claims. In the context of the present disclosure other examples and variations of the apparatus and methods described herein will be apparent to a person of skill in the art.

The invention claimed is:

1. A split cycle internal combustion engine comprising:
   a combustion cylinder accommodating a combustion piston;
   a compression cylinder accommodating a compression piston and being arranged to receive air and compress the air to provide a compressed working fluid to the combustion cylinder for combustion, the compression cylinder being coupled to a water reservoir; and
   a controller arranged to receive an indication of at least one parameter associated with at least one of: (i) the engine, and (ii) a fluid associated therewith, and control an amount of water delivered from the reservoir to the compression cylinder based on the indication of the at least one parameter such that during a compression stroke water in the compression cylinder absorbs, via both sensible heat and latent heat, a rise in temperature caused by the compression stroke such that a majority of the water vaporises into its gaseous phase during the compression stoke and a rise in temperature caused by the compression stroke is limited by absorption of heat by the water;
   wherein the controller is configured to control the amount of water delivered to the compression cylinder such that an amount of water in the compressed working fluid at an end of the compression stroke results in a level of water concentration in the compressed working fluid that is less than a threshold water concentration level, wherein the threshold water concentration level is selected based on a maximum water concentration level in the compressed working fluid for supporting combustion in the combustion cylinder.

2. The split cycle internal combustion engine of claim 1 wherein the indication of at least one parameter comprises an indication of a temperature associated with at least one of: (i) the combustion cylinder, and a fluid associated therewith.

3. The split cycle internal combustion engine of claim 1 wherein the indication of at least one parameter comprises the temperature of an exhaust emitted from the combustion cylinder.

4. The split cycle internal combustion engine of claim 1 wherein the compression cylinder comprises an outlet port and the combustion cylinder comprises an inlet port coupled to the outlet port of the compression cylinder via a recuperator for receiving a compressed fluid therefrom, wherein the recuperator is arranged to raise the temperature of the compressed fluid delivered to the combustion cylinder, and wherein the indication of the at least one parameter comprises at least one of (i) a temperature, (ii) a pressure, and (iii) an oxygen concentration of the fluid in the recuperator.

5. The split cycle internal combustion engine of claim 4 wherein the controller is also configured to control the delivery of water to the recuperator to control the temperature of the compressed working fluid in the recuperator.

6. The split cycle internal combustion engine of claim 1 wherein the indication of the at least one parameter comprises at least one of (i) a temperature of the water being delivered to the compression cylinder, (ii) a temperature of the air being delivered to the compression cylinder, (iii) a humidity of the air being delivered to the compression cylinder, and (iv) an ambient air pressure.

7. The split cycle internal combustion engine of claim 1 wherein the threshold water concentration level is determined based on the maximum concentration of water in the compressed working fluid for sustaining combustion in the combustion cylinder.

8. The split cycle internal combustion engine of claim 1 wherein the controller is configured to control the delivery of water so that the level of water concentration in the compressed working fluid is less than a maximum combustion water concentration level, wherein the maximum combustion water concentration level is the maximum concentration of water in the compressed working fluid for sustaining combustion and above which would prevent combustion from occurring.

9. The split cycle internal combustion engine of claim 1 wherein the controller is configured to operate a heating means to control the temperature of the water delivered to the compression cylinder.

10. The split cycle internal combustion engine of claim 9 wherein the controller is configured to determine a time taken for the delivered water to boil from the moment that it is delivered into the compression cylinder; and
    wherein the controller is configured to control the temperature of the delivered water such that the determined time taken for the delivered water to boil is within a selected water boil time range.

11. The split cycle internal combustion engine of claim 1 wherein the controller is configured to control the temperature of the delivered water such that it is below a boiling point of water for the pressure it is being delivered at.

12. The split cycle internal combustion engine of claim 11 wherein the controller is configured to operate a heating means to control the temperature of the water delivered to the compression cylinder and wherein the controller is configured to operate the heating means to heat the water to a selected water threshold temperature that is below the boiling point of water for the pressure it is being delivered at.

13. The split cycle internal combustion engine of claim 1 wherein the controller is configured to control a pressure of water delivered to the compression cylinder based on at least one of (i) the amount of water delivered, and (ii) an indication of a parameter associated with the engine or a fluid therein.

14. The split cycle internal combustion engine of claim 1 wherein the controller is configured to control a range of droplet sizes of water delivered to the compression cylinder.

15. The split cycle internal combustion engine of claim 1 wherein the controller is configured to control the amount of water delivered into the compression cylinder based on the indication of the at least one parameter such that:
    when the indication of the at least one parameter is less than a target value for the parameter, the controller is configured to deliver no water into the compression cylinder; and
    when the indication of the at least one parameter is equal to or greater than the target value for the parameter, the controller is configured to control the amount of water delivered from the reservoir to the compression cylinder based on the indication of the at least one parameter such that during a compression stroke the water absorbs, via both sensible heat and latent heat, a rise in temperature caused by the compression stroke such that the water vaporises into its gaseous phase during the compression stoke and a rise in temperature caused by the compression stroke is limited by the absorption of heat by the water.

16. The split cycle internal combustion engine of claim 1 wherein the combustion cylinder is coupled to a fuel reservoir, and wherein the controller is configured to control delivery of the fuel to the combustion cylinder based on the indication of the at least one parameter.

17. The split cycle internal combustion engine of claim 16 wherein the controller is configured to control delivery of fuel and water such that the ratio of delivered fuel to delivered water is within a selected range.

18. A split cycle internal combustion engine comprising:
 a combustion cylinder accommodating a combustion piston;
 a compression cylinder accommodating a compression piston and being arranged to provide compressed fluid to the combustion cylinder, the compression cylinder being coupled to a water reservoir; and
 a controller arranged to receive an indication of at least one parameter associated with at least one of: (i) the combustion cylinder, and (ii) a fluid associated therewith and to control an amount of water delivered into the compression cylinder based on the indicated parameter such that:
  when the indicated parameter is less than a target value for the parameter, the controller is configured to deliver no water into the compression cylinder; and
  when the indicated parameter is equal to or greater than the target value for the parameter, the controller is configured to control the amount of water delivered from the reservoir to the compression cylinder based on the indication of the at least one parameter such that:
   during a compression stroke water in the compression cylinder absorbs, via both sensible heat and latent heat, a rise in temperature caused by the compression stroke such that the water vaporises into its gaseous phase during the compression stoke and a rise in temperature caused by the compression stroke is limited by absorption of heat by the water; and
  a water concentration level in the compressed working fluid is below a maximum water concentration level for supporting combustion in the combustion cylinder.

19. A method of operating a split cycle internal combustion engine, the engine comprising:
 a combustion cylinder accommodating a combustion piston; and
 a compression cylinder accommodating a compression piston and being arranged to receive air and compress the air to provide a compressed working fluid to the combustion cylinder for combustion, the compression cylinder being coupled to a water reservoir;
the method comprising:
 receiving an indication of at least one parameter associated with at least one of: (i) the engine, and (ii) a fluid associated therewith, and controlling an amount of water delivered from the reservoir to the compression cylinder based on the indication of the at least one parameter such that during a compression stroke water in the compression cylinder absorbs, via both sensible heat and latent heat, a rise in temperature caused by the compression stroke such that the majority of the water vaporises into its gaseous phase during the compression stoke and a rise in temperature caused by the compression stroke is limited by absorption of heat by the water;
 wherein the delivery of the amount of water is controlled such that the amount of water in the compressed working fluid at an end of the compression stroke results in a level of water concentration in the compressed working fluid that is less than a threshold water concentration level; wherein the threshold water concentration level is selected based on a maximum water concentration level in the compressed working fluid for supporting combustion in the combustion cylinder.

20. A non-transitory computer readable medium comprising computer program instructions configured to program a processor to perform the method of any of claim 19.

* * * * *